United States Patent

D'Amato et al.

[11] 4,223,326
[45] Sep. 16, 1980

[54] METHOD AND DEVICE FOR REDUCING THE PROBABILITY OF LOSS OF A CHARACTER IN A DIGITAL TRANSMISSION EMPLOYING BIPHASE CODING

[76] Inventors: Paolo D'Amato, Via Monte Ortigara 35; Mario Cominetti, Via Verbano 5, both of Turin, Italy

[21] Appl. No.: 896,281

[22] Filed: Apr. 14, 1978

[30] Foreign Application Priority Data

Jun. 28, 1977 [IT] Italy .................... 68489 A/77

[51] Int. Cl.² .................... G06F 11/10; G08C 25/00
[52] U.S. Cl. .................... 371/49; 371/57
[58] Field of Search .......... 340/146.1 AB, 146.1 AG, 340/146.1 R

[56] References Cited

U.S. PATENT DOCUMENTS

| | | | |
|---|---|---|---|
| 3,335,224 | 8/1967 | Meslener et al. | 340/146.1 AB |
| 3,417,333 | 12/1968 | Atzenbeck | 340/146.1 AB |
| 3,671,935 | 6/1972 | Lipp et al. | 340/146.1 AB |

Primary Examiner—Charles E. Atkinson

[57] ABSTRACT

A method for reducing the probability of the loss of a character in a digital transmission employing biphase coding which comprises the steps of identifying the bits out-of-code, that is the bits which don't correspond to the two biphase code configurations; complementing the logic value said bits are given by the demodulator, if there is parity error; inhibiting a character not comprising out-of-code bits, but in which parity error occurs or if two or more out-of-code bits are present in the character. The circuit implementing the method comprises shift register means for storing the information bits and control signals identifying the out-of-code bits; parity check means; complementing means for complementing the logic state which are given by the demodulator to the out-of-code bits, said complementing means being conditioned by the simultaneous occurrence of the out-of-code bit and the parity error in a character; logic means for inhibiting the character in presence of parity error alone or of two or more out-of-code bits.

6 Claims, 4 Drawing Figures

METHOD AND DEVICE FOR REDUCING THE PROBABILITY OF LOSS OF A CHARACTER IN A DIGITAL TRANSMISSION EMPLOYING BIPHASE CODING

The present invention relates to a method and a device which substantially reduced the probability of the loss of a character transmitted in digital code, when biphase keying is used (PSK).

It is known that in the telecommunication field one of the systems used for transmitting information messages at a distance is the so called PCM (pulse code modulation).

According to this system, each instant value of the information or each alphanumeric symbol is associated with a particular code which uniquely identifies the instant value or the alphanumeric character associated therewith, so that this value or character can be reproduced at the receiving side.

It is known that the code comprises a given number "n" of "bits", which are of a time interval $\tau$ and which have one of two electric conditions—called logic states "1" or "0" according to the binary notation. The whole of the bits forming the code is called herinafter "character".

In order to detect the n bits forming each character the message is preceded by a "message beginning" code.

It is known that the distortions or noise introduced by the transmission means can change the character so that it is wrongly interpreted. It is also known that to detect the error the simplest way is to associate with the character a further bit, of such a logic value that the number of logic states 1 in the character becomes even (or odd). When at the receiving side the number of logic states "1" in the character, included the parity bit, is not even (or not odd), there is the so called "parity error" P, and the character is considered as lost. When the transmission gives rise to a double error in a same character, the parity check does not reveal the error, so that the character is accepted but it will be wrongly interpreted.

It is known that the whole of the characters forming the information to be transmitted can be sent to the transmitting means as it has been generated (baseband transmission) or by phase modulating a sine wave carrier. A particular case of this last transmission method is the "biphase" system in which, as is known, the phase of a sine wave carrier, having a period equal to the time allotted to each bit, is shifted by 180° according to the logic state of the bit. If the half sinusoids composing said carrier are considered, and the symbol "A" is associated with the positive half sinusoid whereas the symbol "B" is associated to with the negative one, it is possible for instance to associate logic value "1" with sequence AB and logic value 0 with sequence BA.

If, due to distortions in the transmission system or to noise, the received sequence is AA or BB, the logic value associated with the bit can not be determined; this condition will be hereinafter called "out-of-code bit".

When an out-of-code bit is present, generally the demodulator allots the bit the logic value "1" (or "0") but generates a signal (out-of-code signal), which can be used to make the character with one or more out-of-code bits non valid.

The object of the present invention is to give a method for recovering the character in case of biphase transmission, when the character comprises only one out-of-code bit.

The method according to the invention consists in identifying the out-of-code bits and in complementing the logic value given by the demodulator to the out-of-code bit if the character has at the same time the "parity error"; only if in the character there is parity error with no out-of-code bits, or if there are two or more out-of-code bits, the character is lost.

For a clearer understanding reference is made to the accompanying drawings, in which:

FIGS. 1a–d show the known system of biphase modulation;

Figure 1:
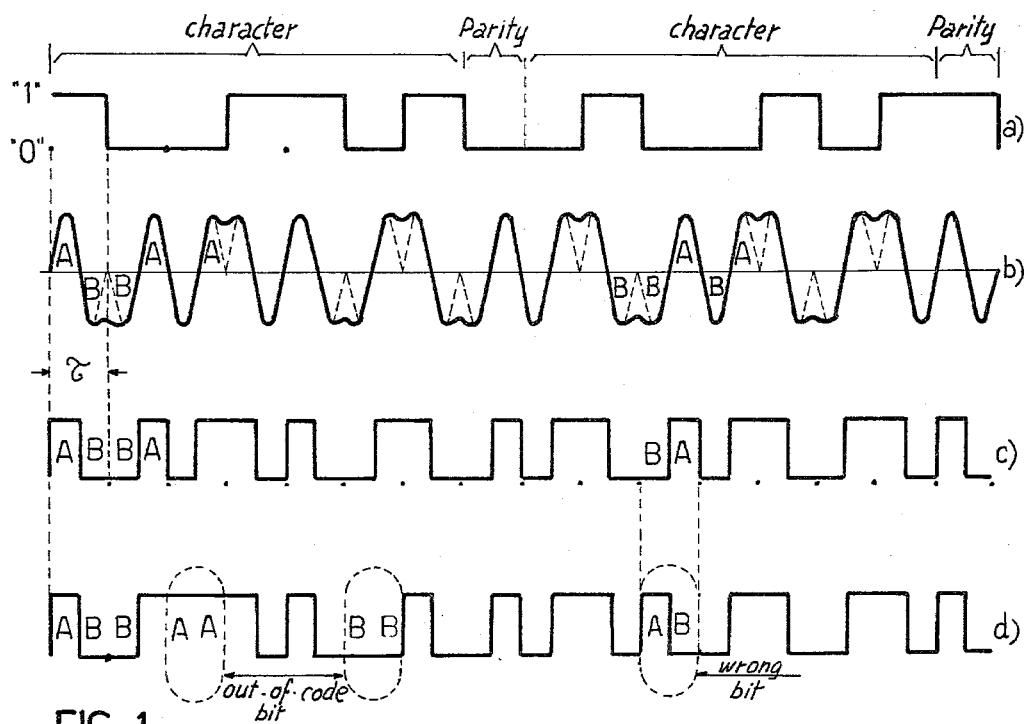

FIG. 1(a) shows in the baseband configuration two characters of a message, each character comprising 7 bits+1 parity bit; FIG. 1(b) shows the same message coded in biphase; FIG. 1(c) shows the biphase signal having no out-of-code bits after the signal has been reformed. FIG. 1(d) shows the same message with two out-of-code bits (respectively the configurations AA and BB, enclosed into the dotted line ellipses) and a wrong bit.

If $P_E$ is the probability that half-wave A is interpreted as B or vice-versa, the probability that a character of 7 information bits+1 parity bit is lost, is improved by using the device according to the invention, and it passes from 16 $P_E$ to about 120 $P_E^2$. On the contrary, the device according to the invention makes the probability of error in the character slightly worse (that is the error probability is increased), as this probability passes from 28 $P_E^4$ (without the device) to the value 112 $P_E^3$. However, as generally the acceptable values of $P_2$ are very low ($<10^{-3}$) the worsening may be considered as negligible in many practical applications.

The following table I shows the differences between a conventional system and the system according to the invention for a character of 7+1 bits. The table is completed by the insertion of the value of the bit error probability ($P_{bit}$). A bit error occurs when configurations AB or BA are inverted, that is they become the time sequences BA and AB, respectively.

TABLE I

|  | conventional system | system of the invention |
|---|---|---|
| bit error probability | $P_E^2$ | $P_E^2$ |
| character error probability | 28 $P_E^4$ | 112 $P_E^3$ |
| probability of losing the character | 16 $P_E$ | 120 $P_E^2$ |

Figure 2:
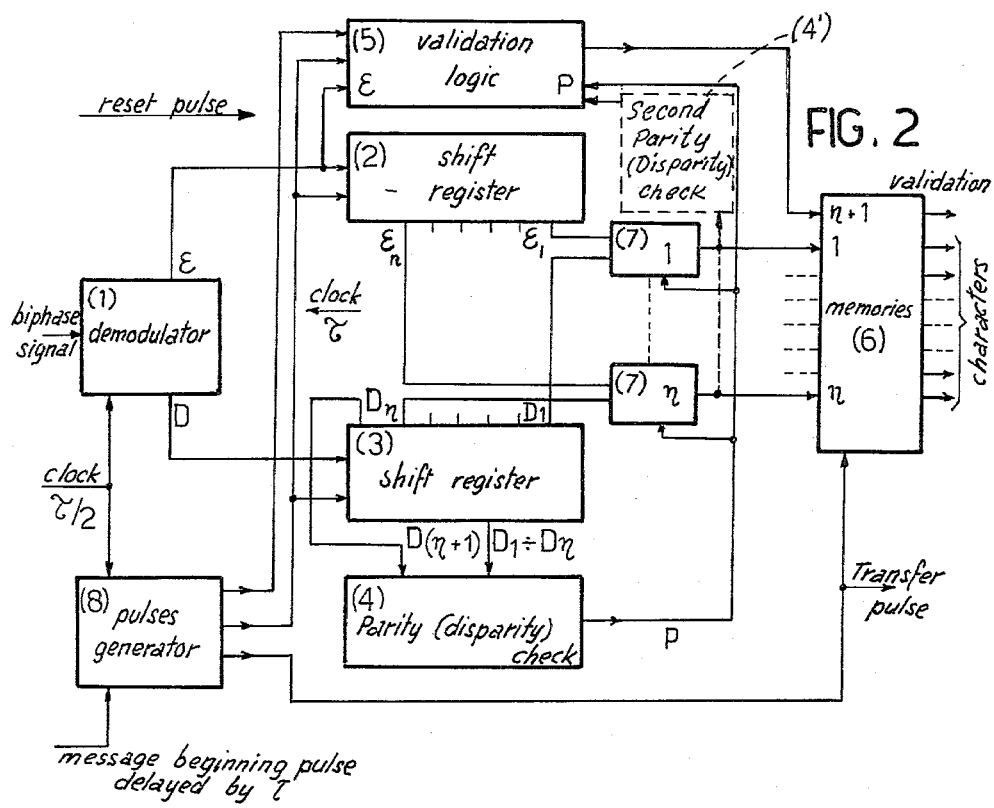
FIG. 2 is a block diagram illustrating the method for character recovery according to the invention.

FIG. 2 is a block diagram of a preferred embodiment of the device according to the invention. It consists of: a demodulator (1) which receives the reformed diphase signal and the clock pulses at a rate $\tau/2$; two shift registers (2) and (3) with serial input and parallel output, each register having as many cells as the bits of a character are, and a further cell for the parity bit; a logic circuit (4) for parity check; a logic circuit (5) for validation of the character; a plurality of complementing circuits (7), whose number is the same as the number n of bits in the character; a flip-flop latch (6) having as many cells as the number (n) of bits in the character, increased by 1; and a circuit (8) generating the pulses necessary for the operation of the circuits (2), (3), (5) and (6).

The input signals are: the biphase reformed signal which is the information message; the clock pulses whose period is half the bit rate ($\tau/2$) and a "message beginning pulse" (which is detected from the date stream) delayed by $\tau$.

The operation of this circuit in the preferred embodiment of FIG. 2 is as follows. The biphase signal is sent to demodulator (1) which, by means of the clock signal coming from an external clock generator, provides two output signals: the data signal D and the signal $\epsilon$ meaning "out-of-code bit"; the logic values of these signals, according to the time sequence of elements A and B in the bit time $\tau$, are shown in table II which shows one truth table of the embodiments of the demodulator.

TABLE II

| Time sequence of the elements within the bit | outputs | |
|---|---|---|
| | $\epsilon$ | D |
| AA | 1 | 0 |
| BA | 0 | 0 |
| AB | 0 | 1 |
| BB | 1 | 0 |

If different truth tables are used for the demodulator, the circuits hereinafter described are accordingly modified without alterations in the base principle of the invention.

Signals $\epsilon$ and D are sent into shift registers (2) and respectively (3) whose output signals $\epsilon_1, \epsilon_2 \ldots \epsilon_n$, $D_1, D_2, \ldots D_n$ are each sent to a combining logic circuit $(7)_1, (7)_2, \ldots (7)_n$.

All output signals of shift register (3), that is $D_1, D_2, \ldots D_n, D_{(n+1)}$ are sent to the parity check circuit (4) whose output P is at logic value "1" or "0" according to whether the number of "1" present at its inputs is even or odd. Also said signal P is sent to the combining logic circuits $(7)_1, (7)_2 \ldots (7)_n$ whose truth table is shown in table III. Here, P≡1 denotes a parity (or disparity) error in the character.

TABLE III

| D | $\epsilon$ | P | output | |
|---|---|---|---|---|
| 1 | 1 | 1 | impossible | ≠ |
| 0 | 1 | 1 | 1 | |
| 1 | 0 | 1 | don't care | |
| 0 | 0 | 1 | don't care | |
| 1 | 1 | 0 | impossible | ≠ |
| 0 | 1 | 0 | 0 | |
| 1 | 0 | 0 | 1 | |
| 0 | 0 | 0 | 0 | |

(≠ The case in which at the same time there is D = 1, $\epsilon$ = 1 cannot occur, see table II)

In the time interval in which the whole character and the parity bit associated thereto occupy n+1 cells of the shift register (3) the logic values of outputs of logics $(7)_1, (7)_2, \ldots (7)_n$ are latched in n memories of register (6) so as to be available at the output.

According to the invention, the character stored in (6) is considered not valid in the following cases:
there is parity error, but there are no out-of-code bits;
the out-of-code bits are more than one.

According to a less advantageous variant of the invention as shown in the dotted lines in FIG. 2, (increasing the character error probability when two or more out-of-code bits are present) the character is first identified for the out of code bits and the parity of the character. If there is no parity, the logic value of the bits corresponding to the out of code bits are complemented. The parity is then checked again by the second parity (disparity) check 4'. Only if this second check is not met is the character then inhibited. The following validation logic circuit refers to the preferred embodiment (FIG. 2).

The validation logic circuit (5) of said figure carries out the following tasks:
it checks the number of out-of-code bits in the character;
it decides according to table IV if the character is valid or is to be neglected.

TABLE IV

| number of out-of-code bits in the character | P | output |
|---|---|---|
| zero | 0 | 0 |
| one | 0 | 0 |
| more than one | 0 | 1 |
| zero | 1 | 1 |
| one | 1 | 0 |
| more than one | 1 | 1 | output "0" denotes a valid character,
output "1" denotes a character to be neglected.

The output signal of said validation logic circuit (5) is sent to the output through a latch that, in the example of FIG. 2, is comprised in the same memory set (6) storing the character.

The actual operation of character neglecting could be performed in the circuits following the device according to the invention.

Figure 3:
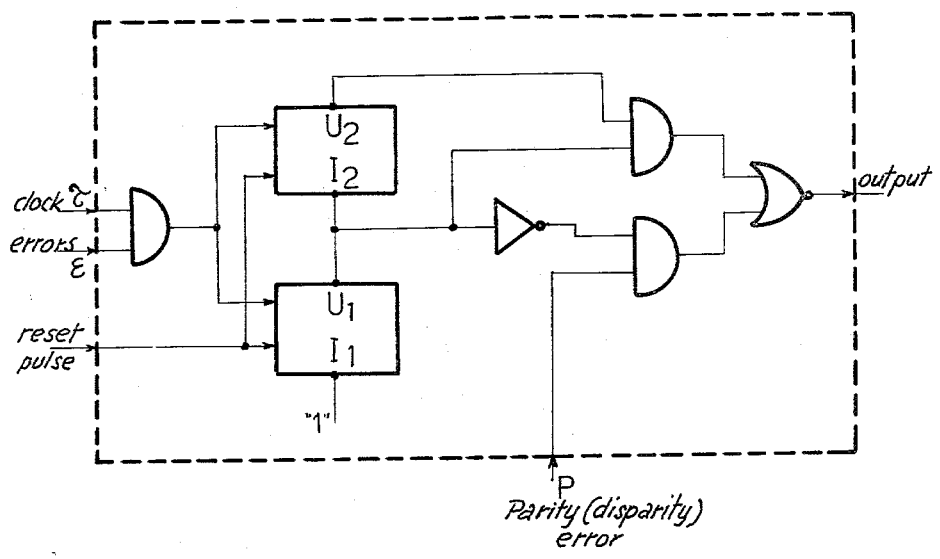
FIG. 3 is a preferred embodiment of the validation circuit.

The preferred embodiment of the validation logic circuit is shown in FIG. 3: here two resettable flip-flops of type D are serially connected and have a common clock input. The clock pulses are the transitions of the clock time at the bit rate (period $\tau$) combined in AND Logic with $\epsilon$, that is with the presence of out-of-code bits. Input $I_1$ of the first flip-flop is permanently connected to the electrical level corresponding to logic value "1". Outputs U1 and U2 of the flip-flops are logically combined with P to meet table V.

TABLE V

| Number of $\epsilon$ | $U_1$ | $U_2$ | P | output |
|---|---|---|---|---|
| zero | 0 | 0 | 0 | 0 |
| one | 1 | 0 | 0 | 0 |
| more than one | 1 | 1 | 0 | 1 |
| zero | 0 | 0 | 1 | 1 |
| one | 1 | 0 | 1 | 0 |
| more than one | 1 | 1 | 1 | 1 |
| reset | 0 | 0 | | |

The two "D" flip-flops are reset immediately after the transfer pulse coming from (8) has latched the memory (6) with the contents of complementing circuits (7) and of the out-put of validation logic circuit (5).

Figure 4:
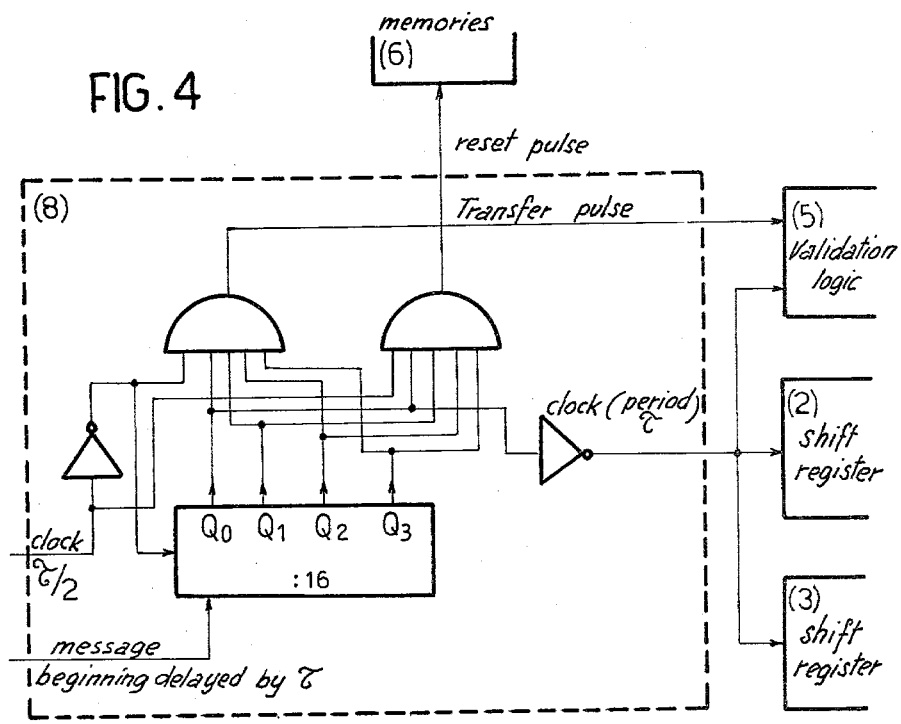
FIG. 4 is a preferred embodiment of the circuit generating the clock pulses necessary to decode the biphase signal.

FIG. 4 shows a preferred embodiment of the pulse generator: a synchronous divide by 16 receives the clock pulses of period $\tau/2$. The clock pulses consist of square waves whose positive front coincides with the central point of each element (A,B) forming the biphase modulated signal.

The divide by 16 is reset in position "1"1"1"1" by the "message beginning" code which, as known, precedes any digital transmission. The phase inverted output signal of the first flip-flop, of the divide by 16 ($Q_0$) is used as pulse signal (positive edge) for blocks (3), (2)

and (5) in FIG. 2; the positive edge of the output of the pulse obtained by logical AND of signals $\tau/2$, $Q_0$, $Q_1$, $Q_2$, $Q_3$ is the instant of transfer of the logic state of the inputs of block (6) into the memories of the same block (6) whereas the output pulse obtained by logic AND of outputs $Q_0$, $Q_1$, $Q_2$, $Q_3$ with the phase inverted clock input signal $\tau/2$ is the reset signal for the "D" type flip-flops of block (5).

Without any inventive effort, all circuits described in FIGS. 2, 3 and 4 can be realized by commercially available integrated circuits on the basis of tables I to V and of the preceding disclosures; in the tables the invention gist is not altered by the inversion of the logic states in each column.

We claim:

1. A method for reducing the probability of loss of a character provided with a parity (or disparity) bit in biphase coded digital communications, comprising:
   identifying the bits out-of-code of each character;
   determining the number of out-of-code bits in the character;
   checking the parity (or disparity) of the character
   complementing the logic value of the bits corresponding to the out-of-code bits in the character if the parity (or disparity) check is not met;
   generating a logic signal denoting a character to be inhibited when the out-of-code bits are more than one or when the parity (or disparity) check is not met and no out-of-code bits have been identified.

2. A method for reducing the probability of loss of a character provided with a parity (or disparity) bit in biphase coded digital communications, comprising:
   identifying the bits out-of-code of each character;
   checking the parity (or disparity) of the character;
   complementing the logic value of the bits corresponding to the out-of-code bits in the character if the parity (disparity) check is not met;
   checking the parity (disparity) of the corrected character and using this new parity signal to inhibit the corrected character whose parity is not met.

3. A device for reducing the probability of loss of a character provided with a parity (or disparity) bit in biphase coded digital communications, the device comprising:
   means for receiving the biphase signal and identifying the bits out-of-code of each character;
   means responsive to said identifying means for determining the number of out-of-code bits in the character;
   means for receiving the biphase signal and checking the parity (disparity) of the character;
   means responsive to the output of the identifying means, the checking means and the determining means for complementing the logic value of the bits corresponding to the out-of-code bits of the character if the parity (disparity) check is not met;
   means also responsive to the output of the identifying means, the checking means and the determining means for generating a logic signal denoting a character to be inhibited when the out-of-code bits are more than one or when the parity (disparity) check is not met and no out-of-code bits have been identified.

4. A device for reducing the probability of loss of a character provided with a parity (or disparity) bit in biphase coded digital communications, the device comprising:
   means for receiving the biphase signal and identifying the bits out-of-code of each character
   means for receiving the biphase signal and checking the parity (disparity) of the character;
   means responsive to said identifying means and said checking means for complementing the logic value of the bits corresponding to the out-of-code bits in the character if the parity (disparity) check is not met;
   means responsive to said last mentioned means for checking the parity (disparity) of the corrected character for using this new parity signal to inhibit the corrected character whose parity is not met.

5. A device for use with a biphase demodulator, for reducing the probability of loss of a character provided with a parity (disparity) bit in biphase coded digital communications, said device comprising at least two shift registers which receive the character and the logic values of the character bits and a signal identifying the out-of-code bits of the character; a circuit responsive to said registers for checking the parity (disparity) in each character; a plurality of complementing circuits connected to said register which complement the logic value assigned by the modulator to the out-of-code bits, said circuits being conditioned by the simultaneous presence of the out-of-code bits and of the parity error in the character; a validation circuit coupled to said circuits which causes said character to be neglected if the parity error occurs alone or it there are two or more out-of-code bits in the character.

6. A device for use with a biphase demodulator, for reducing the probability of loss of a character provided with a parity (disparity) bit in biphase coded digital communications, said device comprising at least two shift registers which receive the character and store the logic values of the character bits and a identifying the out-of-code bits, a circuit responsive to said registers for checking the parity (disparity) in each character, a plurality of complementing circuits connected to said registers which complement the logic state assigned by the demodulator to the out-of-code bits, said complementing circuits being conditioned by the simultaneous occurrence of the out-of-code bits and the parity error in the character, and a second parity check circuit coupled to said complementing circuit for neglecting the corrected character whose parity is not met.

* * * * *